Jan. 25, 1949.                M. CASERTA                 2,460,168
                        METHOD OF MAKING A DIAPHRAGM
Filed Aug. 14, 1944                                    2 Sheets-Sheet 1
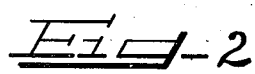
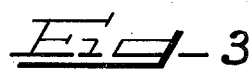
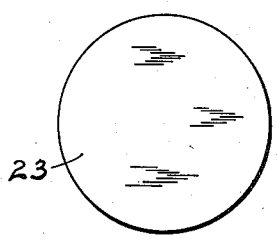
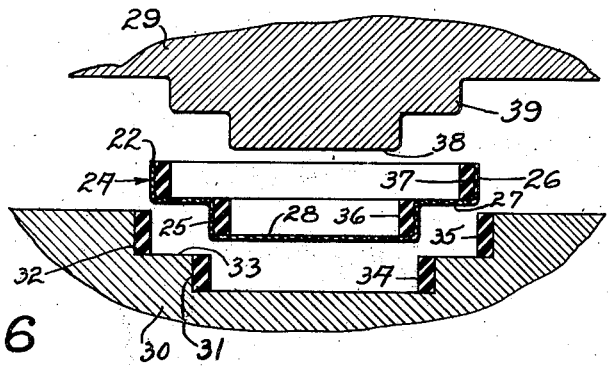
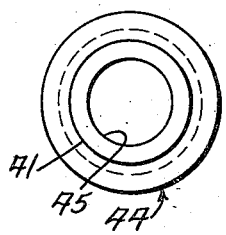
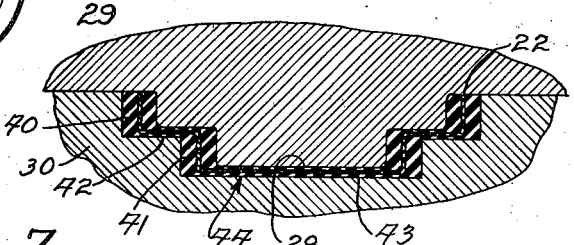
INVENTOR
Michele Caserta Jan. 25, 1949.    M. CASERTA    2,460,168
METHOD OF MAKING A DIAPHRAGM
Filed Aug. 14, 1944    2 Sheets-Sheet 2
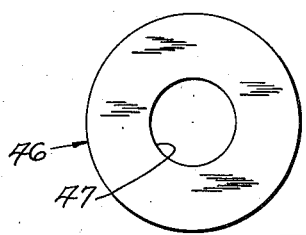
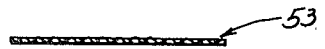
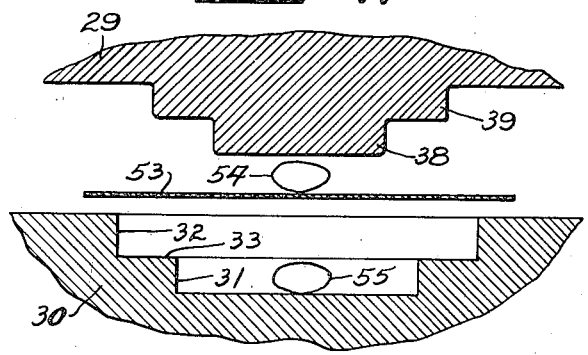
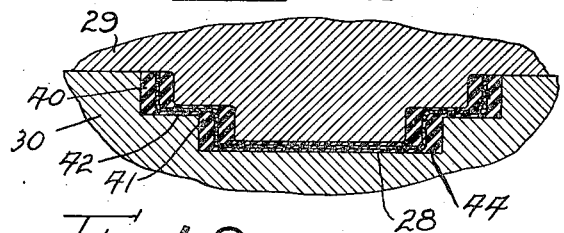
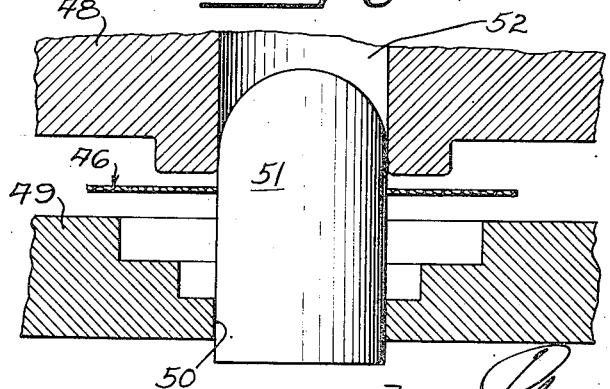
INVENTOR
Michele Caserta Patented Jan. 25, 1949

2,460,168

UNITED STATES PATENT OFFICE 2,460,168

METHOD OF MAKING A DIAPHRAGM

Michele Caserta, Detroit, Mich.

Application August 14, 1944, Serial No. 549,475

1 Claim. (Cl. 18—59)

This invention relates to a method of making a diaphragm. More particularly, the invention relates to an integrally molded diaphragm having gasket-like inner and outer rings interconnected by a relatively thin, flexible web portion.

It has heretofore been customary to manufacture diaphragms having relatively thick edge portions joined by a relatively thin web, but this has generally been accomplished by molding the diaphragm wholly from a synthetic plastic, such as a synthetic rubber, without the use of any reinforcing fabric. While it is relatively easy to mold such a diaphragm from synthetic rubber alone, it has been found very difficult, if not impossible, in that way to produce a diaphragm that has the requisite degree of flexibility and strength over a wide range of temperatures that includes temperatures as low as −60° F. Under such extreme conditions of cold, a thin web of a synthetic rubber becomes relatively rigid and inflexible, if not brittle, and loses much of its tensile strength, with the result that failure is almost certain to occur under the influence of forces tending to flex the web.

I have now found that diaphragms with extremely thin web portions can be made that will satisfactorily withstand extreme cold conditions without failing under stresses due to flexing, provided a reinforcing fabric of greater tensile strength and of higher degree of flexibility under extreme cold conditions is properly incorporated into and bonded with the synthetic plastic material, synthetic rubber, or the like, constituting the body of the diaphragm. Where, however, the web of the diaphragm is to be extremely thin, great difficulties are encountered in so incorporating the reinforcing fabric as to avoid displacement or distortion thereof during the molding process. These difficulties are solved by the method of the present invention.

In accordance with my present invention, the reinforcing fabric, which may suitably be nylon cloth, a textile cloth or even a fabric of finely woven metallic wire, or a very thin perforated metallic sheet, hereinafter generally referred to as a foraminous fabric, is first coated with a suitable plastic material, such as a synthetic rubber. Where the diaphragm is to be used as a shaft seal, or in a valve mechanism in a liquid fuel transfer device, such as a gasoline pump, a synthetic plastic is chosen that will be resistant to the action of the liquid fuel. Various synthetic resins are available on the market that have the property of resisting the attack of petroleum hydrocarbon and these have been found suitable for my present purpose. The synthetic plastic composition is applied either to one or both sides of the foraminous fabric so as to be firmly anchored therein and strongly adherent thereto. The plastic composition at this stage is in an uncured state.

Thereafter, according to my method, a disk of such coated foraminous fabric is either preformed, or formed during the molding step, into the shape that the diaphragm is to take. In the molding step, masses of a similar uncured synthetic plastic are disposed appropriately with respect to the disk of foraminous fabric so as to form inner and outer gasket-like ring portions, while the coated foraminous fabric itself forms a relatively thin, flexible, interconnecting web between such ring portions. At the same time, the coated foraminous fabric becomes embedded in the molded plastic compound or composition so as to form a continuous reinforcing medium for the entire diaphragm. The molded diaphragm is then subjected to a curing step, such as vulcanizing in the case of a synthetic rubber, and to such trimming steps as may be necessary, or desired. For instance, if the diaphragm is to be used as a shaft seal, the central portion of the diaphragm may be cut out, or, alternatively, a centrally apertured disk of the foraminous material may be used initially.

A diaphragm made in accordance with the method of my invention possesses a high degree of flexibility and strength over a wide range of temperatures, including temperatures as low as −60° F., without failure. Even though at such low temperatures the plastic material becomes semi-rigid and relatively brittle, the reinforcement of the stronger and more flexible foraminous fabric suffices to withstand the flexing stresses to which the diaphragm is subjected and thus permits the diaphragm to operate properly if the web portion of the diaphragm is sufficiently thin.

It is therefore an important object of this invention to provide a diaphragm having the characteristics above described and to provide a relatively simple and efficient method of making such a diaphragm.

It is a further important object of this invention to provide a diaphragm of an intergrally molded character having a reinforcing foraminous fabric that is embedded within the material of the diaphragm and securely bonded thereto, whereby the diaphragm can be made with an extremely thin web portion that will retain its flexibility characteristics under extremely low temperature conditions and thus permit the diaphragm to function properly under such conditions.

It is a further important object of this invention to provide a method of molding a composite diaphragm having a reinforcing foraminous fabric embedded therein and integrally bonded to the body portion of the diaphragm which is composed of a synthetic plastic composition, such as synthetic rubber, capable of resisting attack by the petroleum hydrocarbons and aromatics of which liquid fuels are composed.

Other and further important objects of this invention will be apparent from the disclosures in the specification and the accompanying drawings.

Figure 1 is an enlarged transverse sectional view of a coated foraminous fabric for use in making the diaphragm of my invention.

Figure 2 is a top plan view of a disk of the coated foraminous fabric of Figure 1.

Figure 3 is an enlarged sectional view of a preformed disk of the coated foraminous material for use in the method illustrated in Figures 4 and 5.

Figure 4 is a broken, enlarged sectional view of male and female mold parts illustrating more or less diagrammatically the first step in the molding process, using the pre-formed disk of Figure 3.

Figure 5 is a broken, enlarged sectional view of the mold parts in their closed position, showing the final molding and curing step.

Figure 6 is a top plan view of the finished, integrally molded diaphragm produced by the methods illustrated in Figures 1 to 5, inclusive.

Figure 7 is an enlarged transverse sectional view of the finished diaphragm of Figure 6.

Figure 8 is a top plan view of a disk of the coated foraminous fabric provided with a central aperture therein.

Figure 9 is a broken, enlarged sectional view of a modified form of male and female mold parts provided with a centering arbor.

Figure 10 is a sectional view of the disk of the coated foraminous material for use in the method illustrated in Figures 11 and 12.

The reference numeral 20 indicates generally a foraminous fabric that is used as the reinforcing medium in a diaphragm of my invention. The foraminous fabric 20 is preferably a cloth formed of nylon or other relatively strong synthetic fibers. The term "nylon" is here used in the generic descriptive sense as designating the polymeric amide type of plastic. Cloth made of other relatively strong, flexible synthetic fibers, such as those made of the vinyl type of synthetic resin, may also be employed, or cloth of natural fibers, such as cotton, may be used. Cloth of woven metallic wire, or even sheets of perforated or foraminous metal may likewise be used if sufficiently thin. However, as stated above, nylon cloth is preferred as the foraminous material and the invention will be described hereafter in connection with the use of nylon cloth for this purpose.

Before use in the molding operation, the foraminous material 20 is first coated, either on one or both sides, with a plastic composition in an uncured state. As illustrated in Figure 1, the cloth 20 is coated on both sides with a coating 21 that extends through and is embedded in the interstices of the woven cloth. The material of the coating 21 may suitably be a synthetic rubber, preferably of the type that is capable of resisting the attack of aromatic liquid fuel. Various synthetic rubbers having a high degree of resistance toward liquid petroleum hydrocarbons and aromatics are known on the market. The invention is not limited, however, to the use of any particular synthetic rubbers, or to synthetic rubbers generally, since other plastic compositions, such as the vinyl type of resins, and others, may be employed.

Methods of producing a rubberized fabric, such as the fabric 22, are known to the industry. It is important, however, in producing the rubberized fabric 22 that the rubber composition be strongly anchored in the reinforcing foraminous fabric 20 so that it will adhere thereto under all of the conditions to which it may subsequently be subjected. The coating 21 may be applied by calendering, or by otherwise spreading the material of the coating under very high pressures sufficient to cause the rubber composition to penetrate between the fibers of the cloth 20. While extremely high pressures may be used, the pressure is instantaneously localized to a very small region in order to prevent tearing and shifting of the cloth. The coating 21, should, of course, be extremely thin, yet uniform, since it is the rubberized fabric 22 that subsequently serves as the web portion of the finished diaphragm and the web portion must be sufficiently thin to retain its flexibility characteristics under the extreme cold conditions previously referred to. The rubber composition of the coating 21 is at this stage in an uncured state, so that it may be applied to the cloth 20 without the use of a cement, but a cement may be used under some circumstances, if desired.

In the next step, a disk 23 is cut from the rubberized fabric 22. Said disk is of such size as to furnish a continuous reinforcing medium for the diaphragm that is to be made therefrom. According to one form of my invention, the disk 23 is pre-shaped, as by pressure molding, to give a concave member 24 (Fig. 3) having inner and outer concentric, cylindrical flanges 25 and 26. Said flanges 25 and 26 are joined by a flat, annular web portion 27, and the concave member 24 is closed at the bottom by a continuous bottom portion 28.

The molding of the diaphragm may suitably be accomplished in a mold comprising male and female mold parts 29 and 30, respectively (Fig. 4). Said female mold part 30 is provided with a cylindrical lower cavity 31, an upper cylindrical cavity 32 and a flat, annular shoulder 33 joining said cylindrical portions 31 and 32. Rings 34 and 35, of uncured rubber, preferably of similar composition to that of the coating 21, are positioned in said cylindrical cavities 31 and 32, respectively. Said rings 34 and 35 are roughly molded, or otherwise formed, to substantially the diameters of the respective cylindrical cavity portions 31 and 32 so as to fit more or less snugly therein. The concave member 24 is of such dimensions as to be insertable into the female mold part 30 after the rubber rings 34 and 35 have been positioned as described. As the concave member 24 is being inserted into the female mold part 30, or after such insertion, additional rubber rings 36 and 37 are positioned in the concave member 24, the ring 36 fitting against the lower flange 25 and resting upon the bottom portion 28 of said concave member, and the upper ring 37 fitting against the inside of the upper cylindrical flange 26 and resting upon the flat annular portion 27 of said member. The upper male mold part 29 is so contoured as to form with the lower female mold part 30 a mold cavity of the size and dimensions of the finished diaphragm. As shown, the male mold part 29 has a lower concentric cylindrical portion 38 and an upper enlarged cylindrical portion 39, which cooperate, respectively, with the cylindrical portions 31 and 32 of the female mold part 30.

When the mold parts 29 and 30 are brought together (Fig. 5) the concave member 24 of the pre-formed rubberized fabric 22 becomes embedded between the masses of rubber as provided by the rings 37 and 35, and 36 and 34, said pairs of rings now constituting upper and lower gasket-like portions 40 and 41 respectively. There is preferably a sufficient excess of material in the rings 34, 35 and 36, 37 to provide for a flow of the rubber on both sides of the rubberized fabric 22 throughout the web portion 42 thereof, and there may, but not necessarily, be a slight flow of rubber material over the closed bottom web 28, as at 43. In general, over those areas of the diaphragm that must exhibit sustained flexibility in use, the diaphragm is as thin as possible in view of strength requirements, and may be no thicker than the original pre-coated fabric 22, or even thinner by reason of the pressure molding operation.

As illustrated in Figure 5, the web portion 42 is relatively short in length, but it may be, and preferably is, relatively longer with respect to the thicknesses of the gasket-like portions 40 and 41 than there illustrated, and also relatively thinner. The relative dimensions may, of course, be changed to suit requirements, but, in general, the web portion 42 is very thin, being ordinarily of the order of thickness of 0.015 inch.

While the male and female mold parts 29 and 30, respectively, are in the closed position illustrated in Figure 5, they may be heated to effect a cure, or vulcanization, of the rubber composition. Alternatively, the diaphragm, now indicated by the reference numeral 44, may be removed from the mold and cured or vulcanized in a different mold.

The finished diaphragm 44 (Figs. 6 and 7) thus comprises an outer annular gasket-like portion 40 and an inner annular gasket-like portion 41 with an interconnecting web portion 42. Where the gasket is to be used as a shaft seal, it is centrally apertured, as at 45, by simply cutting out the web closing portion 28. It will be noted that the reinforcing rubberized fabric 22 extends continuously from the central aperture 45 through the gasket-like portion 41, the interconnecting web portion 42 and the gasket-like portion 40, thereby reinforcing the entire gasket. In particular, the rubberized fabric 22 reinforces the thin, annular web 42 so as to impart thereto the desired properties of flexibility and strength even at the low temperatures previously mentioned.

In Figures 8 and 9, there is shown a modified form of rubberized fabric disk 46, which is preformed from a sheet of the rubberized fabric 22 by cutting it out to circular form and providing it with a circular central aperture 47. The disk 46 is then placed, without pre-forming, into a modified form of mold (Fig. 9), comprising an upper male member 48 and a lower female member 49. Said female member 49 is centrally apertured, as at 50, to permit the passage therethrough of a retractable centering arbor 51. The upper male die 48 is also centrally apertured for receiving said centering arbor 51. The disk 46 is inserted over the centering arbor 51 while the mold parts 48 and 49 are separated and the centering arbor 51 is in its lower retracted position. As the mold parts 48 and 49 are moved relatively toward each other, the centering arbor 51 also moves toward the male mold part 48 and enters the central opening 52 in said male part. The arbor 51 serves to center the mold parts and also to center the disk 46 with respect to the working faces of said mold parts. The disk 46 may be either preshaped in the modified form of mold illustrated in Figure 9, or this type mold may be used for the final molding of the diaphragm in much the same manner as has already been described in connection with Figures 4 and 5.

Figures 10 to 12, inclusive, relate to still a different method of molding a diaphragm in accordance with the principles of my invention. A disk 53 of the rubberized fabric material 22 is cut to circular form, but without a central aperture. Said disk 53 is next placed in a mold, which, in general, is similar to the mold of Figure 4. The same reference characters are therefore being used in Figure 11 as were used in Figure 4.

As illustrated in Figure 11, prior to closing the mold parts 29 and 30, masses of synthetic rubber or other plastic material, indicated at 54 and 55, are positioned above and below the disk 53, respectively. These masses of rubber 54 and 55 are of such size as to provide the necessary amount of material for forming the finished diaphragm. The mass 55 is placed in the female mold 30, the disk 53 then laid over the female mold cavity, and the mass 54 laid on top of said disk.

When the mold parts are brought together, as illustrated in Figure 12, the masses of rubber 54 and 55 are caused to flow and fill in the mold cavity to produce the outer gasket-like portion 40 and the inner gasket-like portion 41. There may or may not be a sufficient excess of rubber to form an additional coating over the annular web portion 42 and the bottom web portion 28. In any event, the web portion 42 is kept within the required tolerances as thickness. The formed diaphragm 44 is cured within the clamped-together mold parts 29 and 30, or is taken out of the mold and cured, or vulcanized, elsewhere.

The diaphragm 44, whether made by one or another of the methods described, is particularly adapted for use as a seal in an assembly that requires clamping of the diaphragm at its outer edge and at the inner edge around a central opening. In effect, the diaphragm comprises annular gaskets 40 and 41 integrally joined by a thin, flexible web that may serve as a seal between the gaskets. As before stated, the web 42 is sufficiently thin to remain flexible at low temperatures. In some instances, as pointed out above, the web portions 42 may be coated only one side with the synthetic plastic material. Also while the rubberized fabric reinforcing member has been illustrated as disposed centrally and substantially symmetrically with respect to the body of rubber, or other plastic material, it may be desirable in some instances to dispose the rubberized foraminous material entirely on the inside or on the outside of the mass of plastic material.

It will, of course, be understood that various details of construction may be varied through a wide range without departing from the principles of this invention and it is, therefore, not the purpose to limit the patent granted hereon otherwise than necessitated by the scope of the appended claim.

I claim as my invention:

The method of making a diaphragm, which comprises coating a thin, flexible foraminous fabric disk with an uncured synthetic plastic to anchor said plastic in the openings of said fabric, positioning masses of a similar uncured synthetic plastic at opposite sides of said disk, compressing said disk and masses to form said masses into inner and outer spaced ring portions and said disk into a thin flexible web portion joining said ring portions and closing said inner ring portion, curing the portions so formed to produce an integral diaphragm, and removing the central part of said web portion closing said inner ring portion to leave a central opening therethrough.

MICHELE CASERTA.

REFERENCES CITED

The following references are of record in the file of this patent:

UNITED STATES PATENTS

| Number | Name | Date |
|---|---|---|
| 1,309,757 | Kempton | July 15, 1919 |
| 1,454,506 | Christenson | May 8, 1923 |
| 1,639,656 | Kersten | Aug. 23, 1927 |
| 1,790,206 | Farmer | Jan. 27, 1931 |
| 1,813,576 | Kattwinkel | July 7, 1931 |
| 1,860,158 | Petersen | May 24, 1932 |
| 1,918,505 | Wallenberg | July 18, 1933 |
| 2,027,505 | Winkler | Jan. 14, 1936 |
| 2,137,472 | Forbes | Nov. 22, 1938 |
| 2,178,953 | Chilton | Nov. 7, 1939 |
| 2,250,674 | McBarney | July 29, 1941 |
| 2,294,589 | Waterbury | Sept. 1, 1942 |
| 2,307,066 | Paulas | Jan. 5, 1943 |
| 2,330,762 | Tooker | Sept. 28, 1943 |
| 2,349,290 | Loughborough | May 23, 1944 |
| 2,380,983 | Mock | Aug. 8, 1945 |
| 2,385,420 | Meyer | Sept. 25, 1945 |
| 2,401,180 | Parmelee | May 28, 1946 |
| 2,417,510 | McGinnis | Mar. 18, 1947 |

FOREIGN PATENTS

| Number | Country | Date |
|---|---|---|
| 256,897 | Great Britain | Aug. 19, 1926 |